Dec. 3, 1946.  D. M. POOLE  2,411,895

NOZZLE CONTROL

Filed April 15, 1944

INVENTOR
DAVID M. POOLE

Charles A. Warren
ATTORNEY

Patented Dec. 3, 1946

2,411,895

UNITED STATES PATENT OFFICE 2,411,895

NOZZLE CONTROL

David M. Poole, Summit, N. J., assignor to United Aircraft Corporation, East Hartford, Conn., a corporation of Delaware Application April 15, 1944, Serial No. 531,311

11 Claims. (Cl. 60—35.6)

This invention relates to controls for adjusting the exhaust pressure of a turbine.

The copending application of Poole, Serial Number 531,309, filed April 15, 1944, describes a device for adjusting the exhaust pressure of a turbine for maintaining predetermined operation characteristics in the turbine.

This adjustment is particularly advantageous in aircraft power plants where the turbine drives a propeller and the turbine exhaust discharges as a propulsive jet. The adjustment is made by more or less restricting the nozzle. The propulsive jet is least efficient at low speeds of the vehicle, at which speeds the propeller is most efficient. A feature of the present invention is an arrangement for removing any nozzle restriction when full turbine power is desired, as for take-off of the airplane.

Another feature is an arrangement for automatically restricting the nozzle when the airplane reaches a predetermined velocity.

A feature of this invention is the combination of this control, for obtaining full power, with the controls by which the nozzle may be adjusted to maintain predetermined pressure characteristics in the turbine.

For maximum power, the nozzle may be constructed to obtain a diffuser action on the exhaust gas. A feature of this invention is to adjust the nozzle to the advantage of this diffuser action when full turbine power is desired.

Other objects and advantages will be apparent from the specification and claims, and from the accompanying drawing which illustrates what is now considered to be a preferred embodiment of the invention.

Figures 1, 2:
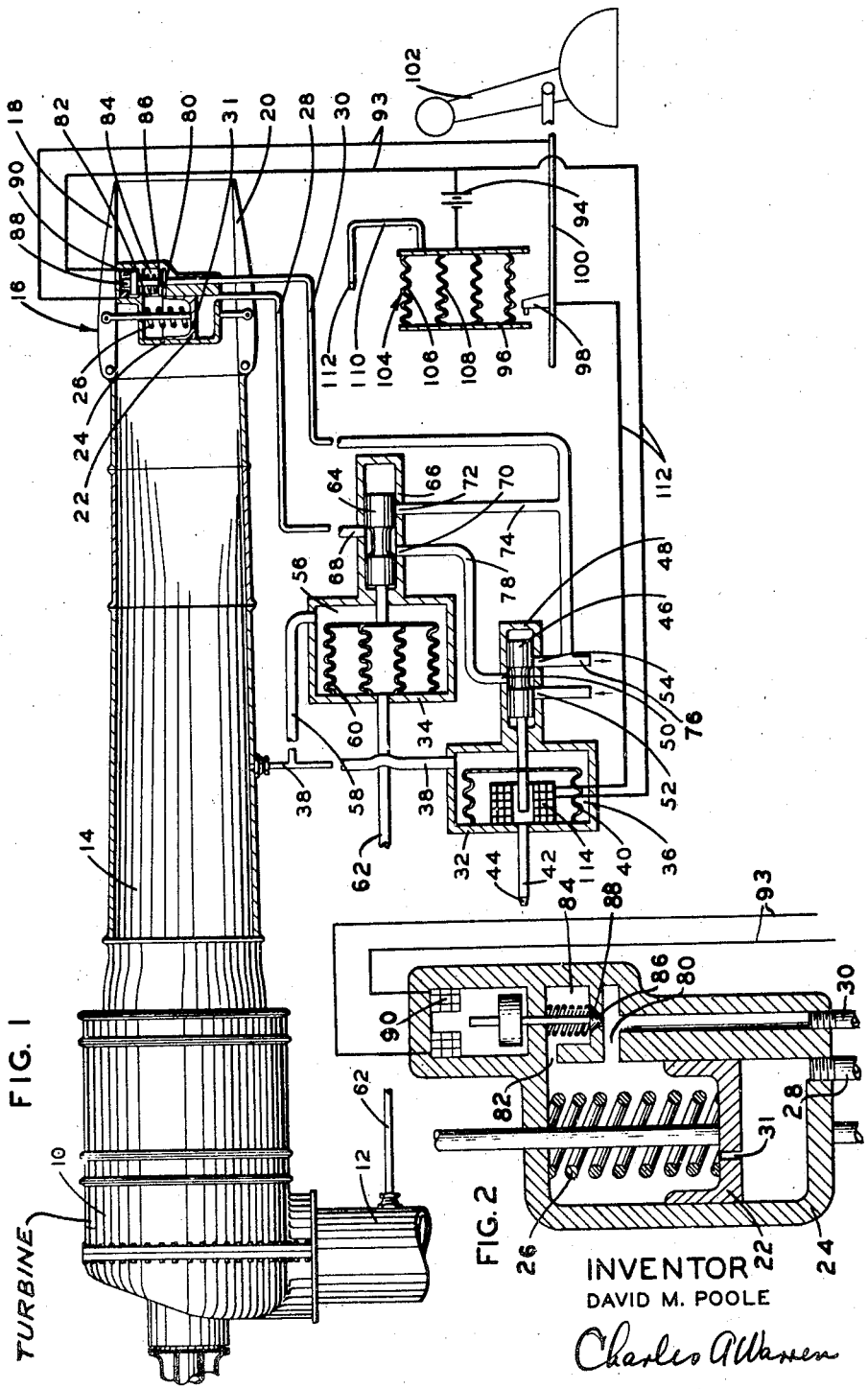
Fig. 1 is an elevation of the device with the thrust nozzle in section, and showing the arrangement of the controls on a larger scale.
Fig. 2 is a sectional view on a larger scale of the nozzle control structure.

The turbine 10 has an inlet duct 12 and an exhaust duct 14 terminating in a nozzle 16 which is adjustable to control its cross section area and thus adjust the pressure drop through the nozzle. The turbine may be driven by hot gas under pressure provided from any suitable source.

The nozzle consists of opposed plates 18 and 20 pivoted at the end of the duct 14 which at this point is rectangular in cross-section. The free outer ends of the plates are moved toward each other for constricting the nozzle by hydraulic means including a piston 22 connected to one plate and a cylinder 24 connected to the other plate. Spring 26 in the cylinder urges the plates together. An inlet duct 28 admits fluid under pressure to one end of the cylinder for moving the plates apart against the action of spring 26 and a duct 30 permits escape of fluid from the other end of the cylinder. A bleed port 31 in the piston may permit a controlled leakage past the piston.

The nozzle adjustment is controlled by two controlling devices 32 and 34 arranged in series. In normal operation the device 34 controls the nozzle and is responsive to the pressures in the intake and exhaust ducts of the turbine to maintain constant an operation characteristic. In the arrangement shown the device maintains a predetermined pressure ratio between the turbine inlet pressure and the exhaust pressure. Under certain conditions the exhaust pressure, if the nozzle were controlled only by device 34, might be less than the atmospheric pressure plus the ram pressure resulting from the forward movement of the vehicle. If this occurs, control device 32 becomes operative, thereby preventing the pressure in the exhaust duct from becoming so low that the gases will be discharged from the nozzle at a velocity less than the forward motion of the vehicle.

Control device 32 may include a chamber 36 which is connected to the exhaust duct by a conduit 38. Within this chamber is a bellows 40, the interior of which is under a pressure equal to the atmospheric pressure added to ram pressure as indicated by a conduit 42 having a forwardly directed end 44. The bellows is connected to a valve for a servo-motor, including a plunger 46 sliding in a casing 48 forming a part of chamber 36. Motion of valve 46 within the casing alternately connects an outlet port 50 to an inlet port 52, connected to a source of fluid under pressure, and a vent port 54.

The device 34 is similar in construction and includes a chamber 56 connected by a conduit 58 to the exhaust duct of the turbine. Within this chamber is a double bellows 60, the inner of which is connected by a conduit 62 to the inlet duct for the turbine. This inner bellows is surrounded by a sealed bellows, the pressure of which is such that the motion of the end plate of the bellows will be proportional to the pressure ratio between inlet and exhaust pressures. A valve 64 is connected to the bellows 60 and slides in a casing 66. The valve alternately connects an outlet port 68 to an inlet port 70 and to a vent port 72, the latter being connected by a conduit 74 to the conduit 76 from vent port 54. Inlet port 70 is connected by a conduit 78 to the outlet port 50 of casing 48 and the outlet port 68 is connected by conduit 28 to the end of cylinder 24.

With the control devices in the position shown, the inlet pressure for the turbine is not high enough to provide the established pressure ratio between inlet and exhaust and still maintain the necessary exhaust pressure. Control device 34 thus functions merely as a fluid connection between device 32 and the nozzle adjusting piston and cylinder and the nozzle is thus under the control of device 32. If the turbine exhaust pressure decreases or if the total of the ram and the atmospheric pressure increases, valve 46 will be moved to vent the end of cylinder 24 and cause further restriction of the nozzle. On the other hand, if the exhaust pressure increases or the total of ram and atmospheric pressure decreases, valve 46 will be moved to the left and connect fluid inlet port 52 to outlet port 50 so that fluid under pressure will enter cylinder 24 and increase the nozzle opening.

If the turbine exhaust pressure becomes greater than the total of ram plus atmospheric pressure and continues to stay greater so that control device 32 becomes ineffective, valve 46 will be moved by this increase in pressure into a position to connect inlet port 52 and outlet port 50. Control device 34 then becomes operative and maintains a constant pressure ratio between the inlet and exhaust pressures of the turbine. If the turbine inlet pressure remains constant, the effect of control device 34 under normal operation will be to maintain a constant back pressure on the turbine.

In addition to adjusting the nozzle for maintaining predetermined operating characteristics in a turbine it may be advantageous to provide for moving the vanes or plates 18 and 20 apart to relieve any back pressure on the turbine in obtaining as much power as possible in the turbine. To accomplish this, passage 80 from cylinder 24 to duct 30 is spaced from the end of the cylinder, thereby limiting the normal distance that piston 22 can move in a direction for opening the nozzle. A port 82 at the extreme end of the cylinder communicates with a chamber 84 and from this chamber through a passage 86 to the passage 80. A valve 88 closes passage 86 so that, in the normal operation of the adjusting means for the nozzle, the movement of the plates apart will be limited by the position of piston 22 at which it covers the end of passage 80.

To cause the plates to move further apart for removing any restriction on the turbine exhaust and for obtaining a diffuser action, valve 86 may be opened, as by means of a coil 90 surrounding the stem of the valve. The coil is included in a circuit 93 including a source of power 94, a plate 96, and a movable contact 98 engageable with the plate. When the plate 96 and contact 98 are in engagement the coil 90 is energized and valve 88 is opened to permit the pressure of fluid in cylinder 24 to move the piston to the end of the cylinder.

Contact 98 may be mounted on a rod 100 connected to the control lever 102 which may also be used to adjusted the fuel supply to the remainder of the power plant. When the lever 102 is moved into a position for maximum power, contact 98 engages plate 96 and moves the vanes 18 and 20 into full open position.

When the power plant is used in aircraft it may be advantageous to have the nozzle wide open at "take-off" and to partially restrict the nozzle after the aircraft reaches a predetermined velocity. To this end, plate 96 forms the movable plate of a bellows system 104 consisting of concentric outer and inner elements 106 and 108, the space within the inner element being sealed. Air is directed into the space between the elements 106 and 108 by a tube 110, the open end 112 of which faces in the direction of motion of the aircraft. As the ram pressure increases, as a result of the increase in velocity of the aircraft, plate 96 will be moved away from contact 98, thereby permitting valve 88 to be closed and restoring the nozzle to the normal control of the devices 32 and 34. By this arrangement the opening of the nozzle for full power is under the control of the operator or pilot, and the automatic control of the nozzle becomes operative when the aircraft reaches a predetermined velocity.

To assure opening of the nozzle into full open position, a circuit 112, in parallel with circuit 93, includes a coil 114 acting on valve 46 to move this valve into a position for admitting fluid under pressure from inlet port 50 to cylinder 24.

It is to be understood that the invention is not limited to the specific embodiment herein illustrated and described, but may be used in other ways without departure from its spirit as defined by the following claims.

I claim:

1. A power plant including a gas turbine, an adjustable nozzle through which gas from the turbine is discharged, means for adjusting the nozzle to obtain a diffuser action, in combination with other means for adjusting the nozzle to obtain predetermined operating characteristics in the turbine, and pressure responsive means for automatically rendering inoperative said first adjusting means when said second means becomes operative.

2. A vehicle power plant including a gas turbine, an adjustable nozzle through which gas from the turbine is discharged, and means for adjusting the nozzle to obtain a diffuser action, in combination with other means for adjusting the nozzle to obtain predetermined operating characteristics in the turbine, and means responsive to changes in the dynamic pressure resulting from the motion of the vehicle for rendering said first means inoperative.

3. A vehicle power plant including a gas turbine, an adjustable nozzle through which gas from the turbine is discharged, a control means, means automatically operable in response to said control means for opening the nozzle to reduce the back pressure on the turbine, and means responsive to changes in the dynamic pressure resulting from the motion of the vehicle for rendering said first means inoperative.

4. A vehicle power plant including a gas turbine, an adjustable nozzle through which gas from the turbine is discharged, a control means, means automatically operable in response to said control means to obtain a diffuser action to reduce the back pressure on the turbine, and means responsive to changes in the dynamic pressure resulting from the motion of the vehicle for rendering said first means inoperative.

5. A power plant including a gas turbine, an adjustable nozzle through which gas from the turbine is discharged, said nozzle including opposed plates between which the gases discharge, at least one of said plates being movable toward and away from the other to adjust the restriction of the nozzle, means responsive to changes in exhaust pressure for adjusting said plates to obtain predetermined operating characteristics in the turbine, a control device, and means operative under the control of said device for moving said plates apart beyond the normal range of movement by said adjusting means.

6. A power plant including a gas turbine, an adjustable nozzle through which gas from the turbine is discharged, said nozzle including opposed plates between which the gases discharge, at least one of said plates being movable toward and away from the other to adjust the restriction of the nozzle, means for adjusting said plates to obtain predetermined operating characteristics in the turbine, a control device, and means controlled by said device for moving said plates apart beyond the normal range of movement by said adjusting means for obtaining a diffuser action.

7. A vehicle power plant including a gas turbine, an adjustable nozzle through which gas from the turbine is discharged, said nozzle including opposed plates between which the gases discharge, at least one of said plates being movable toward and away from the other to adjust the restriction of the nozzle, means for adjusting said plates to obtain predetermined operating characteristics in the turbine, a control device, means controlled by said device for moving said plates apart beyond the normal range of movement by said adjusting means, and means responsive to changes in the dynamic pressure resulting from motion of the vehicle for rendering said plate moving means inoperative.

8. A power plant including a gas turbine, an adjustable nozzle through which gas from the turbine is discharged, means for obtaining a greater or less restriction of the nozzle for adjusting the pressure drop in the turbine, a control device, and other means operative in response to said control device and independently of said adjusting means for relieving any restriction in the nozzle to obtain full power in the turbine.

9. A power plant including a gas turbine, an adjustable nozzle through which gas from the turbine is discharged, a control lever for the power plant, means for adjusting said nozzle, and means responsive to movement of said lever to a predetermined position for procuring operation of said adjusting means for opening of the nozzle for relieving the back pressure on the turbine.

10. A power plant including a gas turbine, an adjustable nozzle through which gas from the turbine is discharged, said nozzle including opposed plates between which the gases discharge, at least one of said plates being movable toward and away from the other to adjust the restriction of the nozzle, means for adjusting said plates to obtain predetermined operating characteristics in the turbine, and other means operative for moving said plates apart beyond the normal range of movement by said adjusting means, in combination with a control lever, and means responsive to movement of said lever to a predetermined position for procuring operation of said other means thereby moving said plates apart independently of said adjusting means for reducing the back pressure on the turbine.

11. A vehicle power plant including a gas turbine, an adjustable nozzle through which gas from the turbine is discharged, said nozzle including opposed plates between which the gases discharge, at least one of said plates being movable toward and away from the other to adjust the restriction of the nozzle, means for adjusting said plates to obtain predetermined operating characteristics in the turbine, and other means operative for moving said plates apart beyond the normal range of movement by said adjusting means, in combination with a control lever, means responsive to movement of said lever to a predetermined position for procuring operation of said other means thereby moving said plates apart independently of said adjusting means for reducing the back pressure on the turbine, and means responsive to changes in the dynamic pressure resulting from the motion of the vehicle for rendering said last means inoperative.

DAVID M. POOLE.